United States Patent
Gale et al.

(10) Patent No.: US 9,892,750 B2
(45) Date of Patent: *Feb. 13, 2018

(54) DYNAMICALLY OPTIMIZING READ PERFORMANCE BY ADJUSTING SERVO-BASED HEAD LOCATION

(71) Applicant: International Business Machines Corporation, Armonk, NY (US)

(72) Inventors: Ernest S. Gale, Tucson, AZ (US); Randy C. Inch, Tucson, AZ (US); Kevin B. Judd, Tucson, AZ (US); David L. Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,462

(22) Filed: Mar. 11, 2016

(65) Prior Publication Data

US 2016/0196846 A1    Jul. 7, 2016

Related U.S. Application Data

(63) Continuation of application No. 14/332,277, filed on Jul. 15, 2014, now Pat. No. 9,299,374.

(51) Int. Cl.
*G11B 27/36* (2006.01)
*G11B 21/02* (2006.01)
(Continued)

(52) U.S. Cl.
CPC .......... *G11B 5/584* (2013.01); *G11B 5/00813* (2013.01); *G11B 27/36* (2013.01); *G11B 5/012* (2013.01); *G11B 2220/956* (2013.01)

(58) Field of Classification Search
CPC ..... G11B 5/584; G11B 5/00813; G11B 5/012; G11B 27/36; G11B 2220/956
See application file for complete search history.

(56) References Cited

U.S. PATENT DOCUMENTS 4,313,141 A * 1/1982 Yanagida ................. G11B 5/55
                                                  360/261.3
5,680,272 A  10/1997 Kadlec et al.
(Continued)

FOREIGN PATENT DOCUMENTS

WO        9927529 A1    6/1999

OTHER PUBLICATIONS

Barrett et al., "Timing-Based Track-Following Servo for Linear Tape Systems," IEEE Transactions on Magnetics, vol. 34, No. 4, Jul. 1998, pp. 1872-1877.
(Continued)

*Primary Examiner* — Andrew L Sniezek
(74) *Attorney, Agent, or Firm* — Zilka-Kotab, P.C.

(57) ABSTRACT

A computer-implemented method includes: determining a reading performance of a head positioned at a commanded lateral reading location based on one or more metrics; adjusting a lateral reading location of the head relative to a medium by moving the head in a lateral direction away from the commanded lateral reading location to an adjusted lateral reading location; determining a reading performance of the head after the adjusting; comparing the reading performance after the adjusting to the reading performance before the adjusting for determining whether the reading performance has improved; and selecting an optimal lateral reading location based on the comparing. The one or more metrics are selected from a group consisting of C1 error correction rate, and C2 error correction rate. Corresponding systems and computer program products are also disclosed.

20 Claims, 9 Drawing Sheets

(51) Int. Cl.
*G11B 5/584* (2006.01)
*G11B 5/008* (2006.01)
*G11B 5/012* (2006.01)

(56) References Cited

U.S. PATENT DOCUMENTS

| | | | |
|---|---|---|---|
| 6,397,369 B1 * | 5/2002 | Despain | H03M 13/00 714/746 |
| 7,139,141 B1 | 11/2006 | Cates et al. | |
| 8,576,510 B2 | 11/2013 | Cherubini et al. | |
| 9,299,374 B2 | 3/2016 | Gale et al. | |
| 2002/0176200 A1 | 11/2002 | Trivedi | |
| 2002/0181143 A1 | 12/2002 | Winarski et al. | |
| 2010/0014189 A1 | 1/2010 | Masuda et al. | |
| 2012/0243118 A1 | 9/2012 | Saliba et al. | |
| 2014/0118856 A1 | 5/2014 | Underkofler | |
| 2016/0019919 A1 | 1/2016 | Gale et al. | |

OTHER PUBLICATIONS

Non-Final Office Action from U.S. Appl. No. 14/332,277, dated Sep. 17, 2014.
Non-Final Office Action from U.S. Appl. No. 14/332,277, dated Jun. 2, 2015.
Final Office Action from U.S. Appl. No. 14/332,277, dated Feb. 20, 2015.
Final Office Action from U.S. Appl. No. 14/332,277, dated Oct. 8, 2015.
Gale et al., U.S. Appl. No. 14/332,277, filed Jul. 15, 2014.
Notice of Allowance from U.S. Appl. No. 14/332,277, dated Dec. 22, 2015.
Gale et al., U.S. Appl. No. 15/796,595, filed Oct. 27, 2017.

* cited by examiner

DYNAMICALLY OPTIMIZING READ PERFORMANCE BY ADJUSTING SERVO-BASED HEAD LOCATION

BACKGROUND

The present invention relates to data storage systems, and more particularly, this invention relates to optimizing dynamic tape track read performance by comparing read performances of different head positions and selecting a head position having higher relative performance than other locations.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

In one embodiment, a computer-implemented method includes: determining a reading performance of a head positioned at a commanded lateral reading location based on one or more metrics; adjusting a lateral reading location of the head relative to a medium by moving the head in a lateral direction away from the commanded lateral reading location to an adjusted lateral reading location; determining a reading performance of the head after the adjusting; comparing the reading performance after the adjusting to the reading performance before the adjusting for determining whether the reading performance has improved; and selecting an optimal lateral reading location based on the comparing. The one or more metrics are selected from a group consisting of C1 error correction rate, and C2 error correction rate.

In another embodiment, an apparatus includes a controller and logic integrated with and/or executable by the controller to: determine a reading performance of a head positioned at a commanded lateral reading location based on one or more metrics; adjust a lateral reading location of the head relative to a medium by instructing the head to move in a lateral direction away from the commanded lateral reading location in to an adjusted lateral reading location; determine the reading performance of the head after the adjustment; compare the reading performance after adjustment to the reading performance before adjustment for determining whether the reading performance has improved; and select an optimal lateral reading location based on the comparing. The one or more metrics are selected from a group consisting of C1 error correction rate, and C2 error correction rate.

In yet another embodiment, a computer program product includes a computer readable storage medium having program instructions embodied therewith. The program instructions are readable and/or executable by a controller to cause the controller to: determine a reading performance of a head positioned at a commanded lateral reading location based on one or more metrics; adjust a lateral reading location of the head relative to a medium by instructing the head to move in a lateral direction away from the commanded lateral reading location in to an adjusted lateral reading location; determine the reading performance of the head after the adjustment; compare the reading performance after adjustment to the reading performance before adjustment for determining whether the reading performance has improved, and select an optimal lateral reading location based on the comparing. The one or more metrics are selected from a group consisting of C1 error correction rate, and C2 error correction rate.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes determining a reading performance based on one or more metrics, adjusting a commanded lateral reading location of a head relative to a medium, determining the reading performance after the adjusting, comparing the reading performance after the adjusting relative to the reading performance before the adjusting for determining whether the reading performance has improved, and selecting a commanded lateral reading location based on the comparing.

In another general embodiment, a controller is configured to perform the foregoing method.

In yet another general embodiment, a computer program product includes a computer readable storage medium having program instructions embodied therewith, the program instructions readable and/or executable by a controller configured to perform the foregoing method.

Figure 1A:
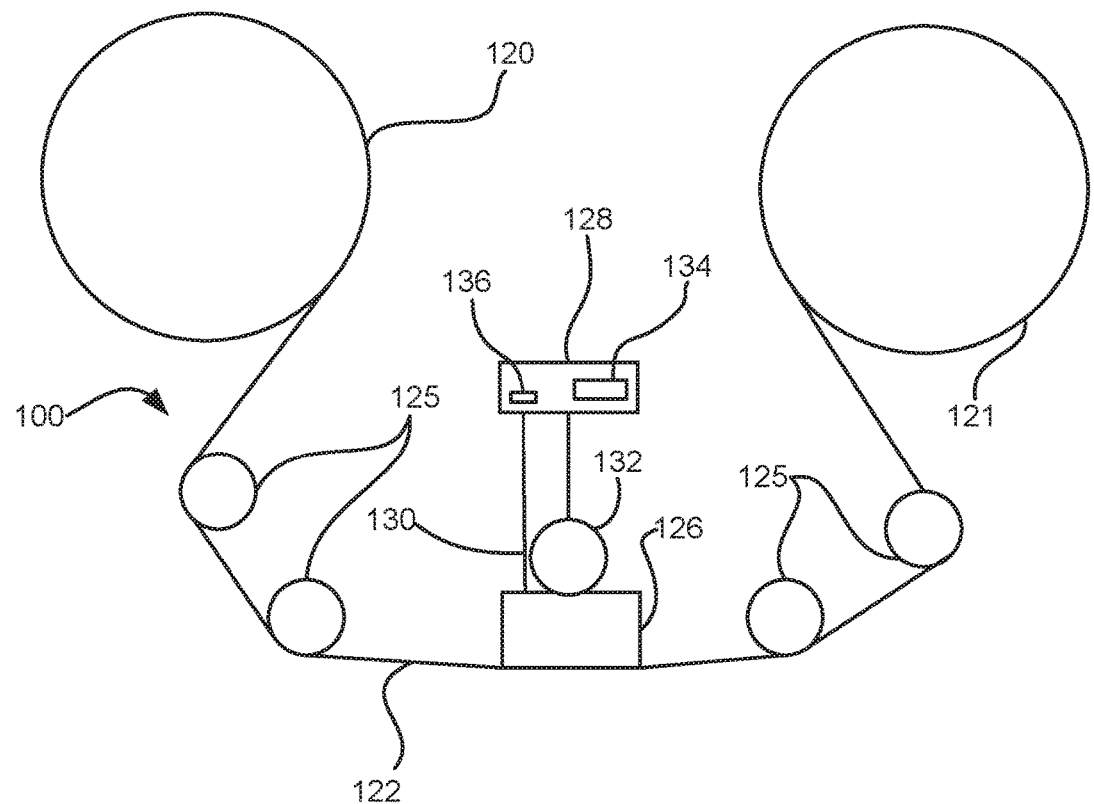
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors, etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
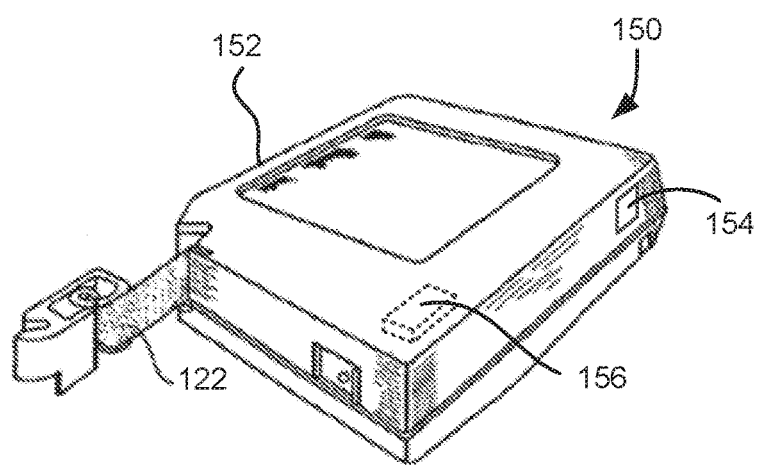
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
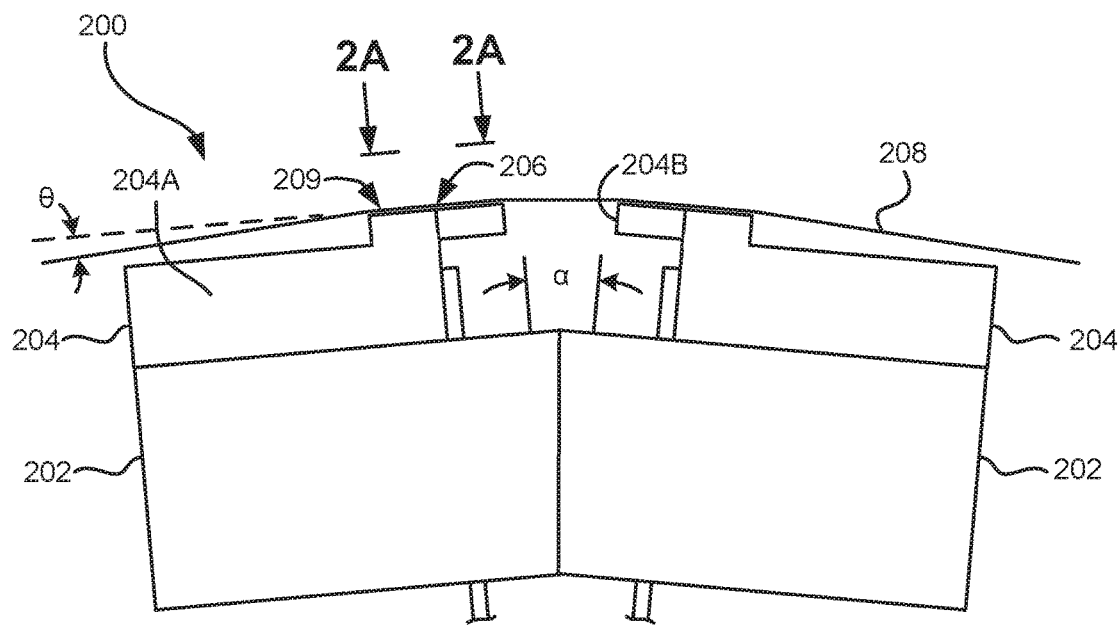
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
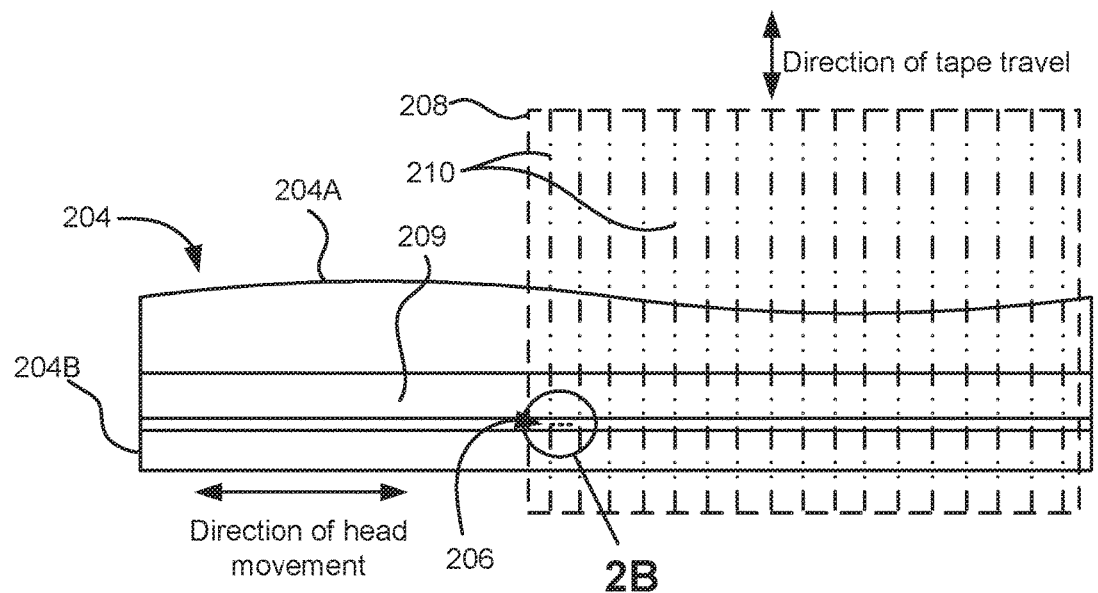
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
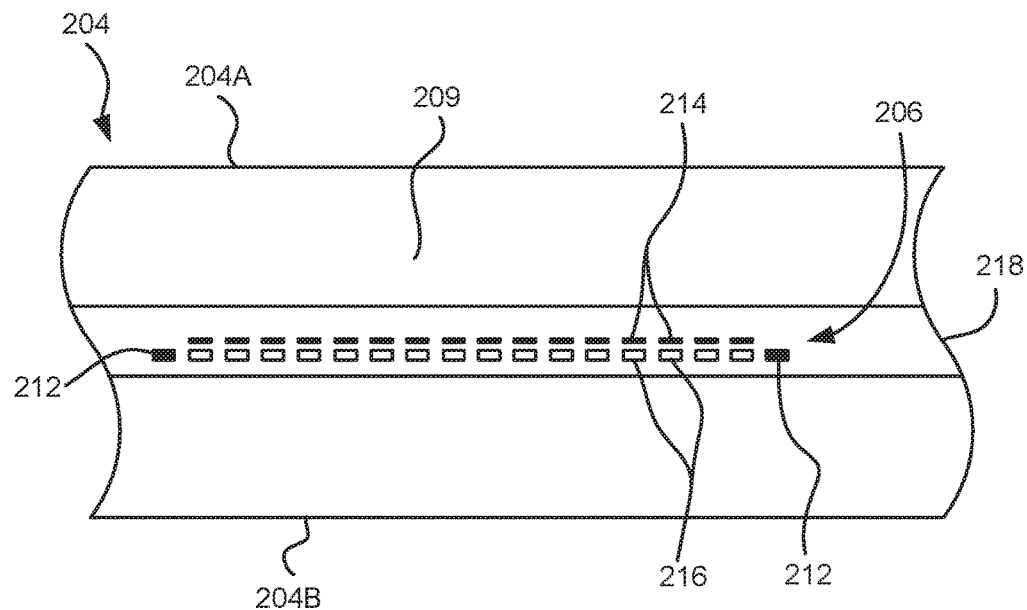
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
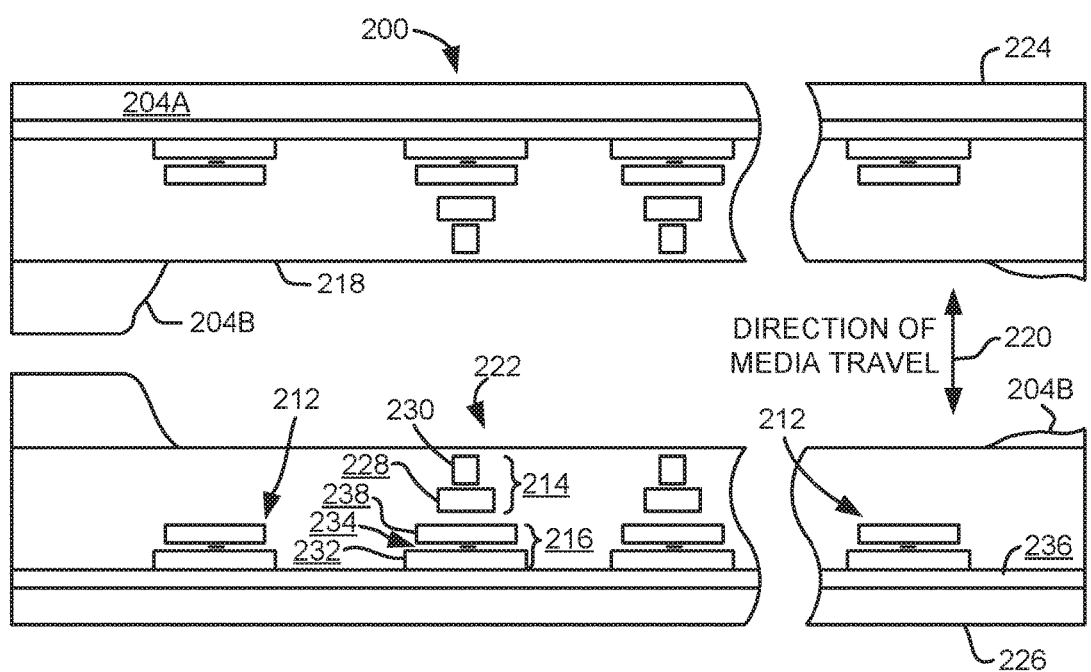
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
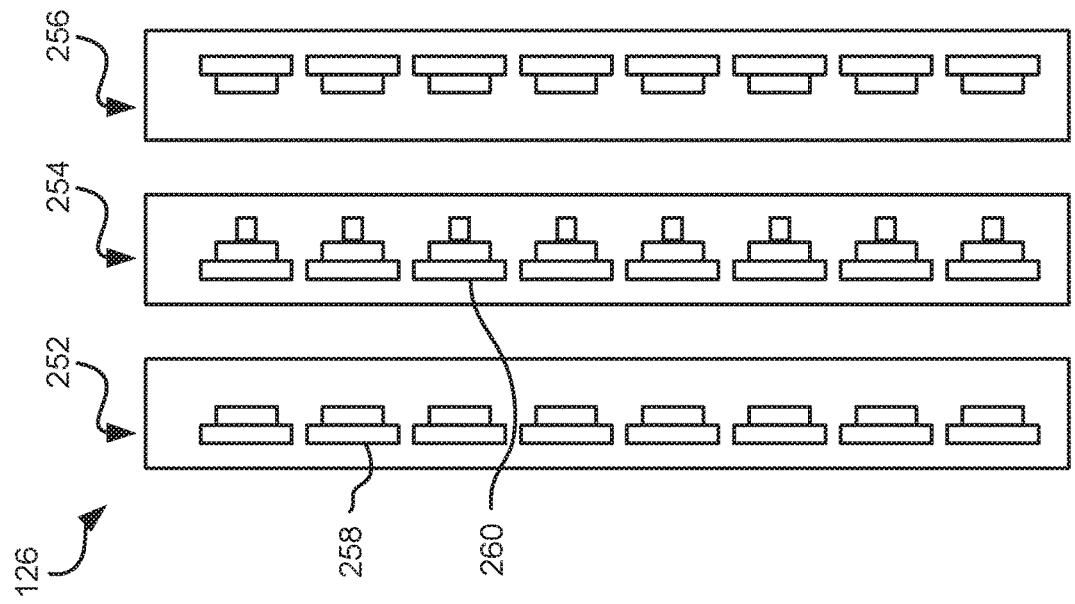
FIG. 4 is a partial tape bearing surface view of a magnetic head having a read-write-read configuration.
Figure 3:
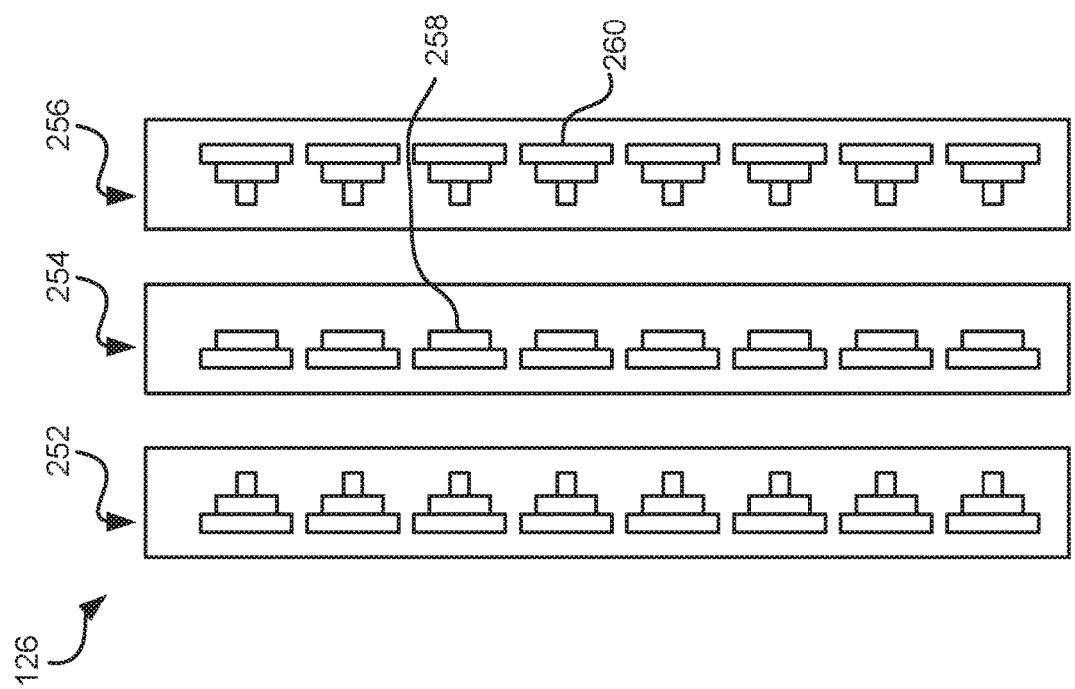
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
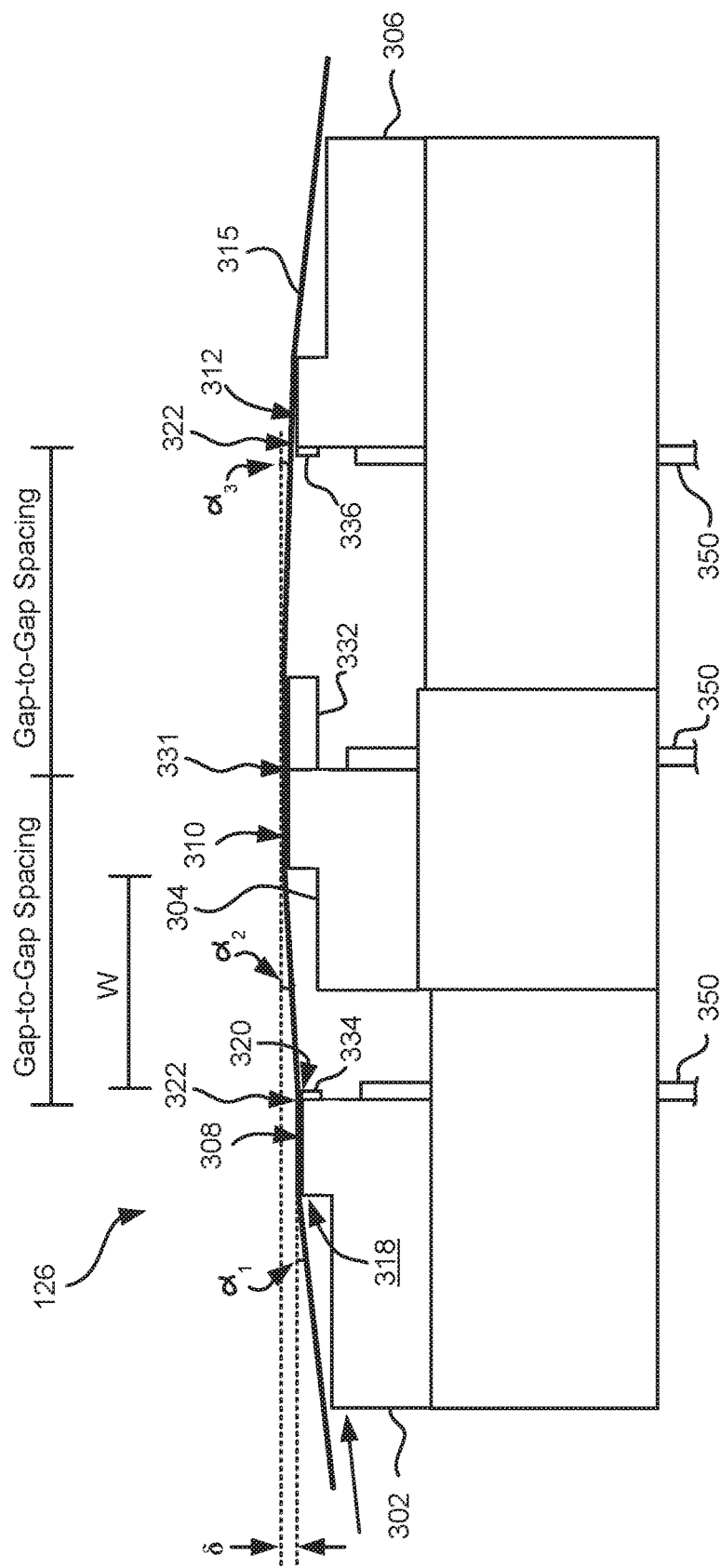
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
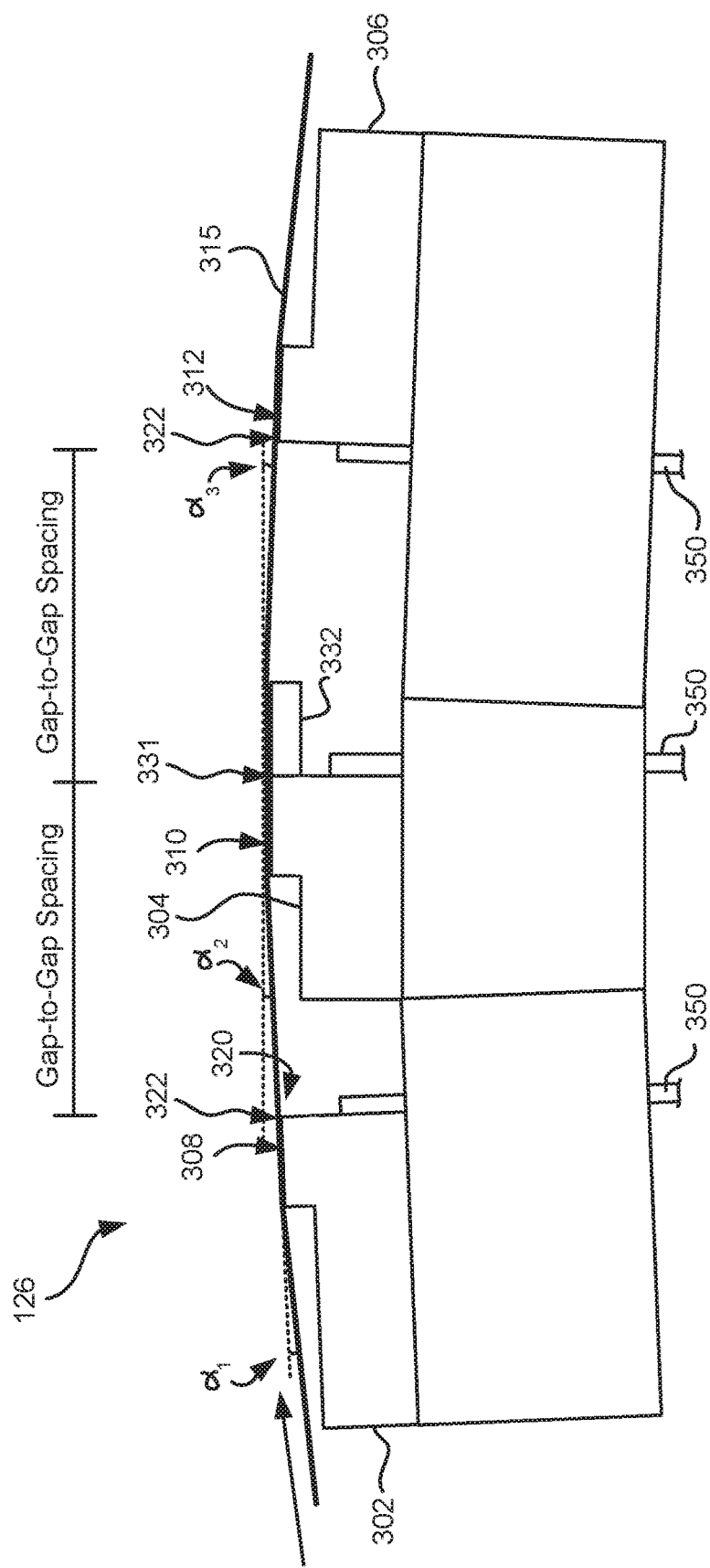
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
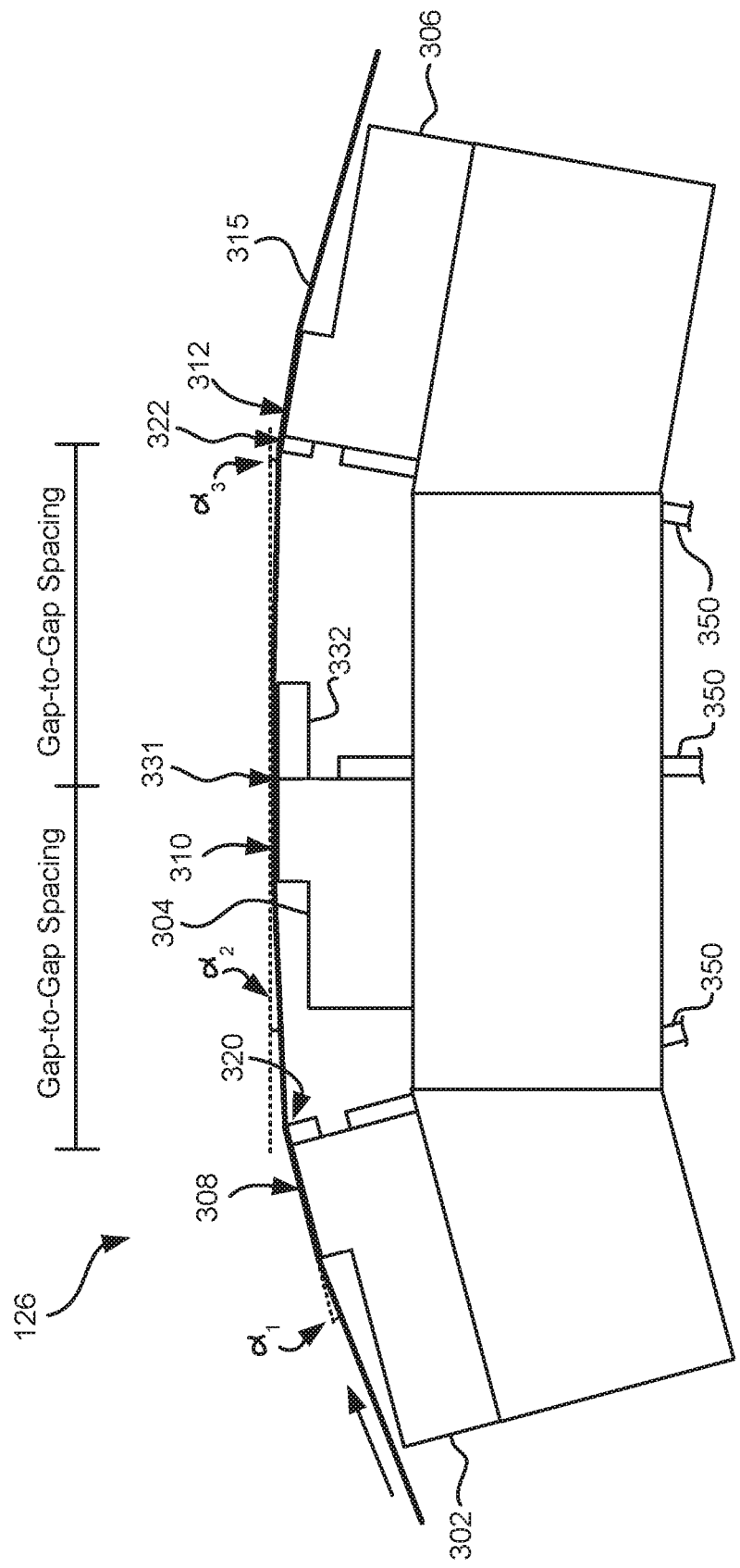
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As described above, in a typical tape drive, the lateral position of a head relative to the tape is servo-controlled. Due to shingling, or partial overwriting of a previous track to leave a smaller resultant written track, the writer on a head is larger than the resultant track width. With a writer width and the shingling track pitch known, a lateral position may be calculated to guide/place a reader in the center of the track initially during reading. The offset, or difference, between the writing location of the non-shingled track and the reading location of the shingled track can be calculated as (WTW-WTP)/2, where WTW is the writer track width and WTP is the written track pitch. However, because data writers may not be precisely located with respect to the servo readers, the data may not be written in the ideal location. Therefore, when it is attempted to read these tracks, the reader may not be ideally located in the center of the written track. Additionally, tracks and/or tape often experience temperature stress, stretching, shingling data loss, tape lateral expansion or contraction due to environmental changes, etc., the calculated center of a track may not be the most optimal location for reading.

As tape drive capacity has increased over time, both the writer width and track pitch have steadily decreased. Additionally, the reader width has not decreased at the same rate, and therefore the margins between the edges of the reader and the edges of written track have decreased. Due to magnetic properties, the writer has a tendency to magnetically alter regions that are slightly outside the writer width. This is known as sidewriting. In the past, tracks were relatively large, and sidewriting comprised a smaller percentage of a written track width than it now does on condensed tracks.

In the process of writing data to a second track, which is shingling a first track, sidewriting has a tendency to erase part of the first track. The resultant magnetic track width is undesirably different and smaller than the track pitch. Additionally, in some embodiments, the resultant reader element may not have a magnetic width that is equal to the physical reader width. The reader magnetic sensitivity may also be non-uniform such that it appears that the reader is not in the center of the track. This may lead to reading errors and non-optimal reads.

For the reasons explained above, determining the servo location for reading by simply calculating a position using the writer width and track pitch may lead to a reader which is not centered on the shingled track. When the reader is not centered, the reading performance is degraded.

Embodiments described herein provide a method, computer program product, apparatus, etc. for continuously optimizing a location for a tape head during reading, rather than just using a pre-programmed read location.

Various embodiments for centering readers in shingled tracks are described below. Embodiments described herein utilize the internal reading performance of a drive to find an optimal servo location in order to maximize reading performance while a drive is actively reading.

Figure 8:
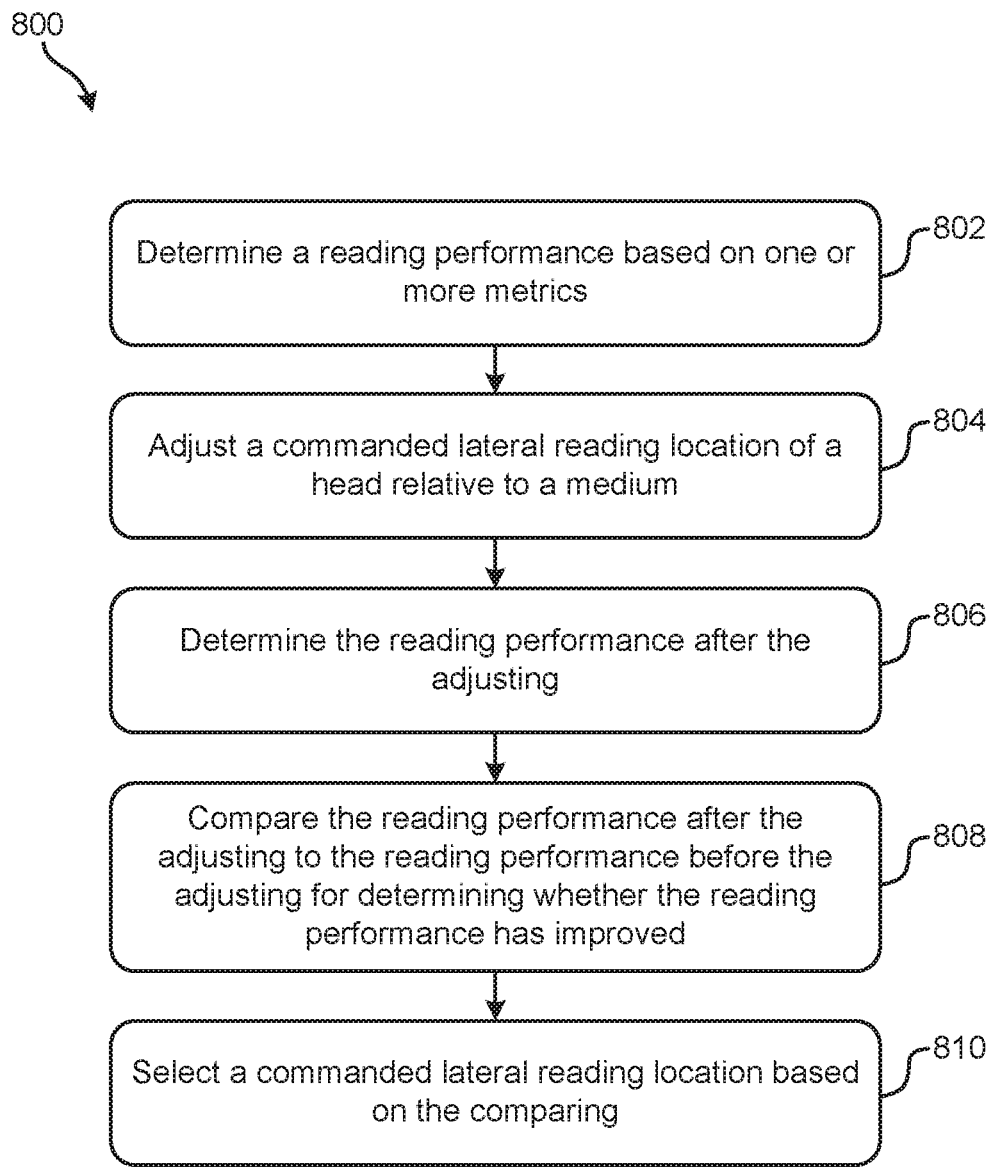
FIG. 8 is a flow diagram of a method, according to one embodiment.

Now referring to FIG. 8, a flowchart of a method 800 is shown according to one embodiment. The method 800 may be performed in accordance with the present invention in any of the environments depicted in FIGS. 1-9, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

A drive in one approach may begin reading in a typical servo reading location, e.g. calculated using the writer width and shingled track pitch (described above), etc.

In another approach, a more optimal tape location to begin reading at before initiating the read performance improvement described herein may be determined by assessing data tracks not (or least) damaged, skewed, etc. by temperature stress, design modifications, stretching, shingling data loss, tape lateral expansion, etc. For example, in a 32 channel drive, if the tape has laterally expanded due to high temperatures and/or high humidity in the drive, the tracks on tape corresponding to the outermost channels may be most expanded, etc., in which case the reader may be centered on and begin reading where the innermost channels are now positioned.

In order to improve read performance, as illustrated in operation 802 of FIG. 8, according to one approach a reading performance may be determined, based on one or more metrics, which may represent a measure of quality. The one or more metrics upon which the reading performance may be based includes C1 error correction rates, C2 error correction rates, soft errors, temporary errors, soft error rates, mean square error rates, and any other error characteristics and/or metrics known in the art, as would become apparent to one skilled in the art upon reading the present disclosure.

C1 error correction rates and C2 error correction rates typically refer to an error rate based on the decoding of a read channel. Particularly, the C1 error rate, which is available per track, and applied first in ECC, is the number of bytes corrected by the C1 code. C2 error rate, which is a single value, is representative of the correction required to correct any errors still remaining after the C1 is applied, and is typically output as the number of bytes corrected, this time across all tracks.

Yet another approach uses the C1 uncorrectable rate, also available per track, which describes the number of C1 entities that were not corrected. The C1 entity is normally a "codeword' or "codeword object".

Temporary soft errors typically occur when there is an error with the signal a drive component is receiving and/or with the datum, etc. Temporary errors typically relate to drive errors, etc.

In further embodiments, the output from a maximum likelihood detector may provide a per track measure of quality, e.g., mean square error (MSE). The detector in the data channel constantly monitors and attempts to detect 1 or 0 by minimizing the MSE. This value may be available for each detected bit, and in some approaches, the filtered (smoothed) MSE is available to observe as a measure of detection quality. It can be checked at any time by code to determine a measure of quality. Note that it is, by its nature, not a measure of detection errors.

In various embodiments, the measures of quality are all most easily available after each dataset (DS) is read or written. The measurement may be performed across multiple datasets (e.g., 10-20 datasets) to determine the trend of the parameters. Then an action may be taken after a determination is made as to whether the quality is the same, better, or worse. Various approaches are not limited to the multi-DS trending, but rather respond at each DS. There may be some interaction between the read offset amount (size of step) and the frequency of change. In one approach, care is taken to keep the offsetting amount small and allowing the read system to settle somewhat before a quality determination is made. Parameters such as the offsetting amount and time to settle may be readily determined by one skilled in the art upon reading the present disclosure.

When using C2 correction data, the reader may simply be shifted around attempting to minimize those corrections.

The per track measurements may allow a track profile to be established. In one exemplary approach, assume there is available 32 tracks of C1 correction, C1 uncorrectables, and detector MSE at each DS read. These provide the ability to observe, for example, if the lower numbered tracks are worse than the upper tracks, in which case a step direction can be determined (e.g., offset reader towards higher tracks, hopefully shifting the lower tracks to be more on track, and not degrading the upper tracks).

Aside from track profiling, the quality metric may include comparing the number of tracks that improved or degraded from a previous measurement, and generating a scoring in a manner known in the art.

It should also be mentioned that the per track values above (not the C2) are available during write, which can provide a good benchmark reading for "best case" values for C1 corrections, C1 uncorrectable, and MSE. This may be valuable because, in various embodiments, the writing condition is the best measure of current system capability because it is not subject to off-track or other read degradations. That is, if benchmark values are captured during write, then these can be compared to values attained on read providing good profiling information. For example, if a read track is dead for any reason, then the per track metrics would be poor for that track during write, and perhaps it can be eliminated from the profiling work described above.

In various embodiments, reading performance may be determined using a technique known in the art, as would become apparent to one skilled in the art upon reading the present disclosure. Additionally reading performance may be determined using information from multiple read channels configured to operate simultaneously. Furthermore, a reading performance may be determined using information from a single channel.

Additionally, according to operation 804, the commanded lateral reading location, e.g. servo reading location, etc. of a head relative to a medium e.g., magnetic medium, optical medium, etc. is adjusted. The adjustment may be initiated after a command is issued to the drive actuator. The adjustment of the commanded lateral reading location of a head relative to a medium (as described above) may be adjusted by a predefined increment, e.g. a set shift allotment, "click" or "tick" etc. in a digital domain, while in the analog domain, the number of shifts is essentially infinite. The number of shifts ("clicks" or "ticks" etc.) allocated for each adjustment of the commanded lateral reading location of a head relative to a medium may be one, two, three, n-shifts, etc. The predefined adjustment increment may be changed depending on the embodiment.

After the adjustment of operation 804 is performed, the reading performance may be determined as noted in operation 806 of FIG. 8. Reading performance may be determined using any of the techniques used in operation 802, and preferably the same technique, as will soon become apparent.

The reading performance of operation 806, taken after the adjustment of operation 804 may be compared to the reading performance before the adjusting for determining whether the reading performance has improved, or equivalently changed but not worsened, as noted in operation 808. Based on the comparison of operation 808, a commanded lateral reading location is selected as noted by operation 810. For example, if the new reading performance is better, the commanded lateral reading location may be set at the location after adjustment. Conversely, if the new reading performance is worse, the commanded lateral reading location may be set at the location prior to adjustment. Moreover, the foregoing selecting may include several adjusting and comparing cycles, in multiple directions, to obtain the desired commanded lateral reading location, as will be described in further detail below.

When the reading performance has improved after the adjusting, or equivalently change but not worsened, the commanded lateral reading location may be maintained. In another approach, the commanded lateral reading location may be adjusted in a same direction and a resulting reading performance is compared with a previous reading performance. When the reading performance has not improved after the adjusting, or equivalently not changed and/or worsened, the commanded lateral reading location may be maintained. In another approach, the commanded lateral reading location may be adjusted in a different e.g., opposite direction and a resulting reading performance is compared with a previous reading performance. Further adjustments based on the approaches described above will be described below in a preferred embodiment of read performance improvement (see FIG. 9).

Figure 9:
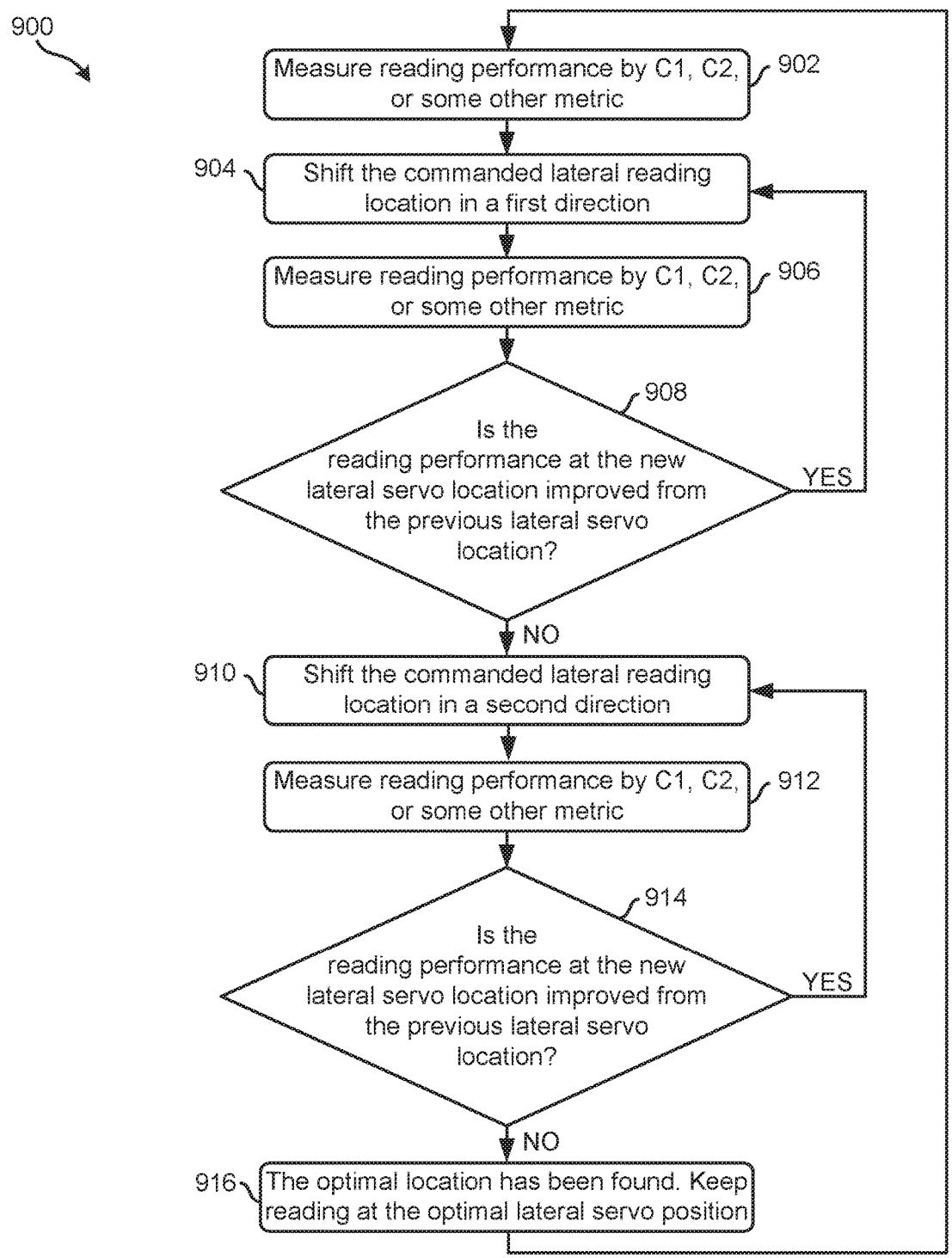
FIG. 9 is a flow diagram of a method, according to one embodiment.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As noted in operation 902 of FIG. 9, a preferred embodiment may measure a reading performance by a C1 error correction rate, C2 error correction rate, and/or some other metric. As described above with reference to FIG. 8, other metrics may include soft errors, temporary errors, and any other errors or metric known in the art, as would become apparent to one skilled in the art upon reading the present disclosure.

With reference now to operation 904, the commanded lateral reading location is shifted in a first direction. As described above, the commanded lateral reading location shift may be adjusted by a predefined increment, e.g. a set shift allotment, "click" or "tick" etc. in a digital domain, while in the analog domain, the number of shifts is infinite. The predefined adjustment increment may be changed depending on the embodiment and/or user preference. In one approach, a shift in commanded lateral reading location results in an actuator moving the first direction the number by a distance corresponding to the predefined adjustment increment.

Once the commanded lateral reading location has been shifted (see operation 904 of FIG. 9), the reading performance of the data may be again measured by a C1 error correction rate, C2 error correction rate, or some other metric, as noted in operation 906.

Method 900 compares the reading performances of operations 902 and 906, as shown in comparator 908 of FIG. 9, to determine if the reading performance at the new lateral servo location (906) has improved from the previous lateral servo location (902). In cases where the comparator 908 determines that the reading performance at the new lateral servo location (906) has improved from the previous lateral servo location (902) as denoted by the "YES" lead of comparator 908 of FIG. 9, operation 904 is again conducted, and the commanded lateral reading location is again shifted in a first direction. Additionally, when the comparator 908 determines that the reading performance at the new lateral servo location (906) has not improved from the previous lateral servo location (902) as denoted by "NO" lead of comparator 908, operation 910 may be conducted, in which the commanded lateral reading location is shifted in a second direction opposite the first direction.

The shift allotment, number of clicks, number of ticks, etc. allocated to a shift of the commanded lateral reading location in a second opposite direction may be incrementally, numerically, periodically, etc. different than the shift allotment, number of clicks, number of ticks etc. allocated to a shift of the commanded lateral reading location in a first direction. Likewise, the shift allotment, number of clicks, number of ticks etc. allocated to a shift of the commanded lateral reading location in a second opposite direction may be incrementally, numerically, periodically, etc. equal to the shift allotment, number of clicks, number of ticks etc. allocated to a shift of the commanded lateral reading location in a first direction.

Following the commanded lateral reading location shift in a second direction (operation 910), the reading performance of the data is measured by a C1 error correction rate, C2 error correction rate, or some other metric as previously noted. Based on the determined reading performance of operation 912, comparator 914 determines whether the reading performance at the new lateral servo location (910) has improved from the previous lateral servo location (904).

In cases where the comparator 914 determines that the reading performance at the new lateral servo location (910) has improved from the previous lateral servo location (904) as denoted by the "YES" lead of comparator 914, operation 910 is again performed, and the commanded lateral reading location is again shifted in a second opposite direction. Additionally, when the comparator 914 determines that the reading performance at the new lateral servo location (910) has not improved from the previous lateral servo location (904) as denoted by "NO" lead of comparator 914, the optimal commanded lateral reading location has been found as noted by operation 916. In some preferred embodiments, once the optimal commanded lateral reading location has been found, as noted in operation 916, reading will continue at the found location until operation 902 is again initiated, e.g., after some period, upon occurrence of a trigger event, etc.

According to various embodiments, the apparatus described herein is configured to perform the determining, comparing and adjusting periodically. The periodic interval at which the apparatus is configured to perform the determining, comparing and adjusting may vary depending on the preferred embodiment. The periodic interval may be static or variable. The periodic interval may be less than 1 second in some approaches. In other approaches, longer periodic intervals are used.

In another approach, the determining, comparing and adjusting may be performed immediately after the end of a previous determining, comparing or adjusting. For example, after it has been determined in operation 916 that the optimal lateral servo location has been found in comparator 914, operation 902 may be initiated immediately, or after reading has occurred at the optimal lateral servo position for any period of time.

In a further embodiment, the apparatus described herein is configured to perform the determining, comparing and adjusting upon occurrence of a trigger condition. A trigger condition may include e.g. logical inputs, user inputs, system temperature/stress flags, etc.

In yet a further embodiment, the apparatus described herein is configured to perform the determining, comparing and adjusting upon occurrence of the end of a timer sequence.

In an even yet further embodiment, the apparatus described herein is configured to perform the determining, comparing and adjusting based upon a combination of the foregoing. For example, the process may occur at some default period until a trigger condition occurs, upon which the periodic interval is shortened.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
    determining a reading performance of a head positioned at a commanded lateral reading location based on one or more metrics;
    adjusting a lateral reading location of the head relative to a medium by moving the head in a lateral direction away from the commanded lateral reading location to an adjusted lateral reading location;
    determining a reading performance of the head after the adjusting;
    comparing the reading performance after the adjusting to the reading performance before the adjusting for determining whether the reading performance has improved;
    selecting an optimal lateral reading location based on the comparing; and
    wherein the one or more metrics are selected from a group consisting of C1 error correction rate, and C2 error correction rate.

2. The method as recited in claim 1, in response to determining the reading performance has improved after the adjusting, performing at least one of:
    maintaining the adjusted lateral reading location, and
    adjusting the lateral reading location of the head by moving the head away from the adjusted lateral reading location in the lateral direction and comparing a resulting reading performance with a previous reading performance.

3. The method as recited in claim 1, comprising, in response to determining the reading performance has not improved after the adjusting, adjusting the lateral reading location of the head by moving the head away from the commanded lateral reading location in a different lateral direction and comparing a resulting reading performance with a previous reading performance.

4. The method as recited in claim 1, wherein the determining, the comparing and the adjusting are performed in response to detecting a trigger condition comprising one or more of a logical input, a user input, and end of a timer sequence, a system humidity warning, and a system temperature warning.

5. The method as recited in claim 1, wherein the determining, the adjusting and the comparing are performed continuously while the head is actively engaged in a read operation.

6. The method as recited in claim 1, wherein the reading performance is determined using information from multiple read channels configured to operate simultaneously,
    wherein when the reading performance has improved after the adjusting, at least one of: maintaining the adjusted lateral reading location, and
        adjusting the adjusted lateral reading location by moving the head away from the adjusted lateral reading location in the lateral direction and comparing a resulting reading performance with a previous reading performance,
    wherein when the reading performance has not improved after the adjusting, at least one of:
        maintaining the adjusted lateral reading location,
        restoring the head to the commanded lateral reading location; and
        adjusting the adjusted lateral reading location by moving the head away from the commanded lateral reading location in a different lateral direction and comparing a resulting reading performance with a previous reading performance.

7. The method as recited in claim 1, wherein the adjusted lateral reading location corresponds to a new lateral servo location relative to a previous lateral servo location used prior to the adjusting; and
    wherein the new lateral servo location and the previous lateral servo location are spatially separated by a predefined adjustment increment in an analog domain.

8. An apparatus, comprising:
    a controller and logic integrated with and/or executable by the controller to:
    determine a reading performance of a head positioned at a commanded lateral reading location based on one or more metrics;
    adjust a lateral reading location of the head relative to a medium by instructing the head to move in a lateral direction away from the commanded lateral reading location in to an adjusted lateral reading location;
    determine the reading performance of the head after the adjustment;

compare the reading performance after adjustment to the reading performance before adjustment for determining whether the reading performance has improved; and select an optimal lateral reading location based on the comparing; and wherein the one or more metrics are selected from a group consisting of C1 error correction rate, and C2 error correction rate.

9. The apparatus as recited in claim 8, further comprising logic integrated with and/or executable by the controller to determine whether the reading performance has improved after adjustment, and in response to determining the reading performance has improved, either:

maintain the adjusted lateral reading location, or adjust the lateral reading location of the head in a same direction and comparing a resulting reading performance with a previous reading performance.

10. The apparatus as recited in claim 8, further comprising logic integrated with and/or executable by the controller to: determine whether the reading performance has improved after adjustment, and in response to determining the reading performance has not improved adjusting the lateral reading location of the head by moving the head away from the commanded lateral reading location in a different direction and comparing a resulting reading performance with a previous reading performance.

11. The apparatus as recited in claim 8, wherein the determining, the adjusting, the comparing and the selecting are performed continuously while the head is actively engaged in a read operation.

12. The apparatus as recited in claim 8, wherein the reading performance is determined using information from multiple read channels configured to operate simultaneously.

13. The apparatus as recited in claim 8, further comprising:

the head, wherein the head is electrically coupled to the controller;

an actuator mechanism for actuating the head in an analog domain; and a drive mechanism for passing a magnetic medium over the head.

14. The apparatus as recited in claim 8, wherein the C1 error correction rate and the C2 error correction rate are benchmark values captured during a write operation.

15. A computer program product, the computer program product comprising a non-transitory computer readable storage medium having program instructions embodied therewith, the program instructions readable and/or executable by a controller to cause the controller to:

determine a reading performance of a head positioned at a commanded lateral reading location based on one or more metrics;

adjust a lateral reading location of the head relative to a medium by instructing the head to move in a lateral direction away from the commanded lateral reading location in to an adjusted lateral reading location;

determine the reading performance of the head after the adjustment;

compare the reading performance after adjustment to the reading performance before adjustment for determining whether the reading performance has improved; and select an optimal lateral reading location based on the comparing; and wherein the one or more metrics are selected from a group consisting of C1 error correction rate, and C2 error correction rate.

16. The computer program product as recited in claim 15, wherein the C1 error correction rate, and the C2 error correction rate are benchmark values captured during one or more write operations.

17. The computer program product as recited in claim 15, further comprising logic integrated with and/or executable by the controller to determine whether the reading performance has improved after adjustment, and in response to determining the reading performance has improved, either:

maintain the adjusted lateral reading location, or adjust the lateral reading location of the head in a same direction and comparing a resulting reading performance with a previous reading performance.

18. The computer program product as recited in claim 15, further comprising logic integrated with and/or executable by the controller to: determine whether the reading performance has improved after adjustment, and in response to determining the reading performance has not improved adjusting the lateral reading location of the head by moving the head away from the commanded lateral reading location in a different direction and comparing a resulting reading performance with a previous reading performance.

19. The computer program product as recited in claim 15, wherein the determining, the adjusting, the comparing and the selecting are performed continuously while the head is actively engaged in a read operation.

20. The computer program product as recited in claim 15, wherein the reading performance is determined using information from multiple read channels configured to operate simultaneously.

* * * * *